Figure 1:
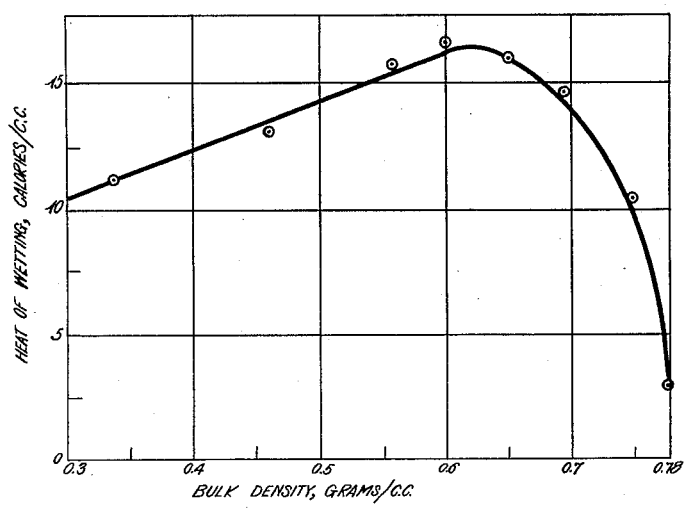

Inventor
Bernard W. Gamson
Lee J. Gary
By
Attorneys

Patented Oct. 10, 1950

2,525,343

UNITED STATES PATENT OFFICE 2,525,343

METHOD FOR ACTIVATING COMPOSITIONS OF CARBON, HYDROGEN, AND SULFUR

Bernard W. Gamson, Morton Grove, Ill., assignor to Great Lakes Carbon Corporation, Morton Grove, Ill., a corporation of Delaware Application June 16, 1948, Serial No. 33,253

6 Claims. (Cl. 260—139)

This invention relates to a method for activating compositions composed of carbon, hydrogen and sulfur by treatment with sulfur vapor at temperatures between about 1100–1800° F.

The sulfur-carbon-hydrogen compositions with which this invention is concerned are prepared by reacting elemental sulfur with hydrocarbonaceous or heavy hydrocarbon materials under conditions to produce a hard, infusible, dense, amorphous substance. The method of forming this is the subject of my co-pending application 649,730, filed February 23, 1946, now Patent No. 2,447,004, issued August 17, 1948.

In general the basic raw material is prepared by forming a uniform liquid mixture of a high-boiling hydrocarbon followed by heating at temperatures of about 400–1800° F. to produce the solid substance. Hydrocarbons suitable in the process are those liquid or liquefiable within the range of about 300–450° F. and having a hydrogen content of about 4 to about 12%. Hydrocarbonaceous substances such as coal which are solid in the above-noted temperature range do not produce the active products of the present invention.

The amount of sulfur employed in making the base material for subsequent activation should be at least 60% of the stoichiometric equivalent of the hydrogen content of the hydrocarbon material to be reacted with it. Preferably 90–110% of sulfur is employed. A uniform mixture is made by mechanically mixing elemental sulfur, usually in finely divided form, with the hydrocarbon. This may be done using a hot mixture, or the mixture may be first made and then heated. It is highly important that agitation and heating be continued until a uniform liquid mixture is obtained. Ordinarily, temperatures around 350° F. are suitable and the general range of 300–450° F. may be employed. The temperature is then increased to a point within the range of about 450–1800° F. This may be done in two steps, first increasing the temperature to about 500–625° F. until the mixture of hydrocarbon and sulfur completely reacts and becomes solid. At this point a hard, infusible, insoluble, amorphous substance is formed having the following range of compositions:

Carbon_____ About 47% to about 70%
Hydrogen_____ About 4.0% to about 1.8%
Sulfur_____ From about 50% to about 25%
Real density____ From about 1.3% to about 1.7%

Up to about 2½% of oxygen, nitrogen and ash may be present, depending on the composition of the organic raw material used.

These compositions are referred to as sulfo-hydrocarbons. Usually, advantage is taken of the liquid condition of the mixture initially formed, before conversion to a solid state within the range of 450–625° F., to produce the solid in the form of discrete particles of desired size. This can be done by spraying the liquid onto heated particles of the sulfo-hydrocarbon formed in a prior operation under such conditions that the sulfo-hydrocarbon builds up to form balls. According to another method, a fine spray of the liquid may be injected into a heated zone under conditions such that individual droplets will be converted into solid particles of the desired dimension. Minute solid particles or dust of the sulfo-hydrocarbon may be kept in a fluidized state in the reaction zone and permitted to grow in particle size by deposition of the liquid mixture sprayed on the fine suspended solids followed by its hardening as the reaction proceeds.

The sulfo-hydrocarbon thus prepared is then heated in a separate step to a temperature in the range of about 1100–1800° F. generally in an inert atmosphere. Hydrogen sulfide is evolved due to the pyrolysis of the sulfo-hydrocarbon. The resulting product is black in color, hard, dense, insoluble, infusible and inactive insofar as the usual gas absorption, decolorization, etc., operations are concerned. The substance has the composition in the range as follows and is referred to as a sulfocarbon.

Carbon_____ 70% to 93%
Hydrogen_____ 1.8% to about 0.3%
Sulfur_____ 25% to about 6%
Ash, $O_2N_2$_____ 0.1% to about 2.5%
Real density_____ 1.5 to about 1.9

I have previously disclosed in my copending patent application referred to above that the sulfocarbon just described is substantially completely convertible to carbon disulfide by reaction with sulfur vapors at a temperature between about 1100–1800° F. I have further discovered, however, that if this reaction is stopped after about 10% to about 90% of the sulfocarbon has been consumed, that the solid residue has the properties of a highly activated carbon and is suitable for use, without further treatment, as an activated carbon. The activated material thus produced preferably comprises from about 65% to about 90% of the original sulfo-carbon.

The sulfohydrocarbon and sulfocarbon are very hard and dense materials. For many purposes these are too hard to grind to the requisite degree of fineness in an economical manner prior to activation. By the present activation treatment, however, the resulting products are rendered less dense and more friable, thus can be readily ground to fine powders; e. g., through 200 or 300 mesh screen for use in water purification, or as an active filler for rubber.

Under certain conditions it may be advisable to further treat the sulfur-activated residue for a short period of time in an oxidizing atmosphere of steam or carbon dioxide. This reduces the combined sulfur content of the residue and for certain purposes improves its activity.

The activated carbonaceous body thus produced may be used to decolorize mineral and vegetable oils, sugar solutions, and various chemical solutions for which the recognized activated carbons of commerce are usually employed. The activated material thus produced may also be employed as a filler for various purposes, especially where an activated particle surface is desired. It can be included as a reinforcing agent in the compounding of natural or synthetic rubber. This may be done by grinding or otherwise comminuting the residue to a particle size of the order of 100 millimicrons. To facilitate the production of my activated carbonaceous solids, the sulfo-hydrocarbon may be produced in the form of fine particles by injecting the liquid charge mixture of hydrocarbon and sulfur into a hot zone in the form of a fine mist to be converted thereto a solid powder. Upon calcining this powder at a temperature of 1200–1800° F. and then treating it with sulfur vapor at a temperature of about 1100–1800° F. and preferably at about 1200–1600° F., a part of the carbon in this sulfocarbon powder is consumed. This has the effect not only of activating the material but of further reducing the particle size and apparently of rendering it particularly susceptible of pulverization to the extent required for use in the compounding of rubber and the like.

The activated carbonaceous products of the present invention may be produced in varying degrees of density and therefore have advantages especially applicable to various requirements. A relatively dense, strong carbon for gas absorption can be made by an activation-consumption of 10–40% of the carbon content of the carbonaceous solids charged. A less dense material for other purposes such as decolorization of oil, sugar, chemicals, etc., can be made by more prolonged activation. The absorption activities compare well with the best activated carbons known in commerce.

In the activation process it is preferred to react the carbonaceous material with sulfur vapor at such a temperature as will give a maximum yield of product for a given activity. It has been found that this requires that the material be calcined at a temperature slightly below, say 50° C., than that at which it is to be activated.

Referring now to the figures which appear in the appended drawings, further correlation of activation conditions will be made clear.

Figure 1 shows the general relationship between activity and the density of the activated material. The activity is expressed as heat of wetting in m-xylene as calories per cubic centimeter of the activated material tested by the method described in Ind. Eng. Chem., vol 34, pp. 14 and 131, (1942). The density is expressed as the bulk density of the granular sample which has been gravity packed by gentle tapping in a laboratory graduate of suitable size. The correlation shown in this figure has been found to be substantially independent of the temperature of activation in the useful range of about 1200–1800° F.

Figure 2:
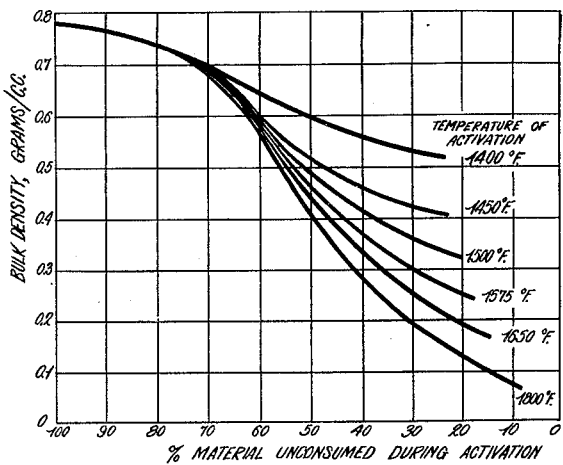

Figure 2 shows the general relationship I have found to exist between the bulk density of the activated material and the weight percentage of the original material remaining after activation with sulfur vapor. The effect of the temperature of activation upon the bulk density of the activated material is shown in this figure by the curves obtained at the various temperatures from 1400 to 1800° F. It will be noted here that to obtain a given bulk density, with least consumption of the original material, the higher temperatures of activation are to be preferred. For example, at 1800° F. a yield of 63% of the charge is obtained, while at 1400° F. the yield is about 50%, both products having the bulk density of 0.6 gm./cc., and the same activity.

Figure 3:
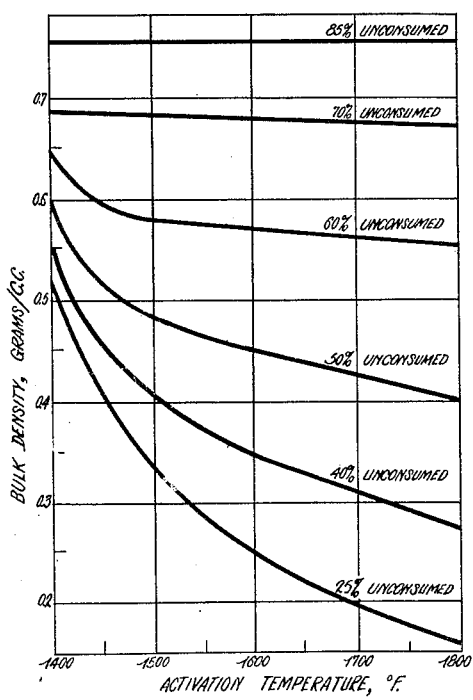

Figure 3 shows the relationship between the bulk density and the temperature of activation, which relationship is also affected by the degree of consumption to be desired during activation. Curves are shown for various percentage yields of activated products obtained. From this figure it can be seen, for example, that at 50% yield of activated product, products having various densities each suited to specific uses may be obtained depending on the temperature of activation employed.

The bulk density factor which appears in the foregoing correlations is a measure of the internal porosity of the granules of the activated product. It is the control of such porosity which is a determining factor in the application of the activated product for specific adsorptive purposes. The conditions for development of various degrees of porosity in activation have been described in connection with the various correlations brought out in Figures 1–3. It should be kept in mind that whatever temperature is selected for the activation treatment, the sulfocarbon charge material should not be calcined above that temperature, but preferably slightly below it as already indicated. The material is less reactive with sulfur vapor if calcined at a temperature above the activation temperature.

The following example illustrates the utility of the process but should not be construed as limiting it to the exact conditions employed.

*Example*

An activated carbon was prepared as follows:

A heavy cracked petroleum residue, liquid at room temperature (70° F.) was mixed with the stoichiometric equivalent of sulfur (based on hydrogen content of 8%). The mixture was heated to 350° F. until uniform, and then heated at 500° F. until it became hard and infusible. It was broken up to pass a 4 mesh screen and heated in a tube to 1400° F. Sulfur vapor was passed over it at 1420° F. until 76.8% of the carbon was consumed by conversion to carbon disulfide, a valuable byproduct. The residue contained 68.5% carbon, 0.3% hydrogen and 23.6% sulfur. The sulfocarbon before activation contained 76.9% carbon, 0.94% hydrogen, and 15.2% sulfur.

The activated material was highly active for gas absorption, and for decolorizing sugar solutions. When ground to a fine powder the material was an effective filler compounded with rubber.

This sulfocarbon material was used activated under various conditions and the data in the appended curves were obtained.

I claim as my invention:

1. A process for manufacturing activated carbonaceous compounds which comprises reacting a sulfocarbon with sulfur vapors at a temperature of about 1100–1800° F. to consume approximately 10–90% of the sulfocarbon.

2. A process for manufacturing activated carbonaceous compounds which comprises reacting a sulfocarbon with sulfur vapors at a temperature of about 1200° to about 1600° F. to consume approximately 10–65% of the sulfocarbon and recovering the unreacted carbonaceous substance.

3. A process which comprises reacting a sulfocarbon with sulfur vapor at a temperature of about 1100–1600° F. until about 10–65% has disappeared, separating the residue and contacting it with an oxidizing agent selected from the group consisting of steam and carbon dioxide.

4. A process for producing an activated carbonaceous substance which comprises heating a sulfo-hydrocarbon at a temperature in the range of about 1100–1800° F. thereafter contacting the thus heated body with sulfur vapor at a temperature of about 1100–1800° F. thereby consuming at least 10% of the sulfocarbon, and recovering the activated material.

5. A process which comprises forming a uniform mixture of a hydrocarbonaceous substance having a hydrogen content of about 4% to about 12% and being liquid in the range of about 300–450° F. with elemental sulfur in proportions of about 60% of the stoichiometric equivalent of the hydrogen content of said substance, converting the mixture to an infusible solid at 450–625° F., thereby further dehydrogenating it by evolving hydrogen in the form of hydrogen sulfide, thereby producing a dense, hard, infusible, insoluble, amorphous substance having a density of about 1.5 to about 1.9, a carbon content of about 70–93%, a hydrogen content of about 0.3 to about 1.8%, and sulfur content of about 6% to about 25%, said sulfur being combined chemically with said hydrogen and carbon, thereafter contacting the material with sulfur vapor at a temperature in the range of about 1100–1800° F., continuing said contact until about 10–90% of the carbon content has been converted to carbon disulfide, and thereafter recovering the residue in an activated condtion.

6. A friable, porous activated carbonaceous substance having a bulk density in grams per cubic centimeter of between about 0.08 and about 0.8, formed in accordance with the process of claim 5.

BERNARD W. GAMSON.

REFERENCES CITED

The following references are of record in the file of this patent:

UNITED STATES PATENTS

| Number | Name | Date |
|---|---|---|
| 2,447,004 | Gamson | Aug. 17, 1948 |